(12) United States Patent
Nakai et al.

(10) Patent No.: US 10,177,552 B2
(45) Date of Patent: *Jan. 8, 2019

(54) GROMMET

(71) Applicant: SUMITOMO WIRING SYSTEMS, LTD., Yokkaichi, Mie (JP)

(72) Inventors: Hirokazu Nakai, Yokkaichi (JP); Tomohiro Yabashi, Yokkaichi (JP); Masashi Hayashi, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/495,479

(22) Filed: Apr. 24, 2017

(65) Prior Publication Data

US 2017/0229855 A1  Aug. 10, 2017

Related U.S. Application Data

(62) Division of application No. 15/338,713, filed on Oct. 31, 2016, which is a division of application No. (Continued)

(30) Foreign Application Priority Data

Jul. 4, 2013 (JP) .................................. 2013-140911

(51) Int. Cl.
*H02G 15/013* (2006.01)
*B60R 16/02* (2006.01)
(Continued)

(52) U.S. Cl.
CPC ....... *H02G 15/013* (2013.01); *B60R 16/0222* (2013.01); *H01R 13/5219* (2013.01);
(Continued)

(58) Field of Classification Search
None
See application file for complete search history.

(56) References Cited

U.S. PATENT DOCUMENTS 3,081,102 A   3/1963  Murray et al.
4,248,459 A *  2/1981  Pate ...................... F16L 3/1236
                                                          174/665

(Continued)

FOREIGN PATENT DOCUMENTS

CN       1385935 A   12/2002
CN     101331351 A   12/2008
(Continued)

OTHER PUBLICATIONS

Sep. 5, 2017 Office Action issued in U.S. Appl. No. 15/338,713.
Jun. 18, 2018 Office Action issued in U.S. Appl. No. 15/338,713.

*Primary Examiner* — Dimary S Lopez Cruz
(74) *Attorney, Agent, or Firm* — Oliff PLC (57) ABSTRACT

To achieve high waterproofness, a grommet that is attached so as to cover a shield pipe and a corrugated tube so as to bridge therebetween includes a pipe-side end portion that is formed in a tubular shape capable of being sealingly connected to an outer circumferential side of the pipe, and a corrugated-side end portion that is formed in a tubular shape capable of being sealingly connected to an outer circumferential side of the corrugated tube. A plurality of sealing lips that closely contact to an outer surface of the shield pipe are formed on an inner surface of the pipe-side end portion. The sealing lips are disposed inside and outside a width region W that is fastened by a fastening band disposed on an outer surface of the pipe-side end portion.

11 Claims, 4 Drawing Sheets

Related U.S. Application Data

14/324,661, filed on Jul. 7, 2014, now Pat. No. 9,515,467.

(51) Int. Cl.
*H01R 13/52* (2006.01)
*H02G 3/04* (2006.01)
*H02G 3/06* (2006.01)
*H02G 3/08* (2006.01)
*H02G 3/22* (2006.01)

(52) U.S. Cl.
CPC ......... *H02G 3/0468* (2013.01); *H02G 3/0666* (2013.01); *H02G 3/0691* (2013.01); *H02G 3/088* (2013.01); *H02G 3/22* (2013.01)

(56) References Cited

U.S. PATENT DOCUMENTS

| | | | |
|---|---|---|---|
| 4,491,350 A * | 1/1985 | Wolf | F16L 21/005 |
| | | | 285/23 |
| 4,542,922 A * | 9/1985 | Grossauer | F16L 25/0045 |
| | | | 285/320 |
| 4,814,547 A | 3/1989 | Riley et al. | |
| 4,829,145 A * | 5/1989 | Mitchell | H02G 3/06 |
| | | | 174/480 |
| 5,072,972 A * | 12/1991 | Justice | F16L 25/0036 |
| | | | 285/148.11 |
| 5,105,054 A * | 4/1992 | Kirma | H01B 7/0045 |
| | | | 174/2 |
| 5,267,877 A * | 12/1993 | Scannelli | F16L 25/0036 |
| | | | 439/584 |
| 5,767,448 A | 6/1998 | Dong | |
| 6,019,615 A | 2/2000 | Masuda | |
| 6,042,396 A | 3/2000 | Endo et al. | |
| 6,053,749 A | 4/2000 | Masuda et al. | |
| 6,441,306 B1 | 8/2002 | Iwaguchi | |
| 6,524,121 B2 * | 2/2003 | Kanagawa | H01R 9/0518 |
| | | | 439/95 |
| 6,649,839 B2 * | 11/2003 | Eckert | F04D 15/0218 |
| | | | 174/74 A |
| 8,052,153 B2 | 11/2011 | Ebihara et al. | |
| 8,834,279 B2 * | 9/2014 | Oh | F16D 3/843 |
| | | | 464/15 |
| 9,376,069 B2 | 6/2016 | Nakai et al. | |
| 2004/0060723 A1 * | 4/2004 | Pallapothu | B60R 16/0222 |
| | | | 174/653 |
| 2004/0187258 A1 * | 9/2004 | Tsuji | H01R 13/501 |
| | | | 16/225 |
| 2009/0166983 A1 | 7/2009 | Ebihara et al. | |
| 2013/0313787 A1 | 11/2013 | Fujiki | |

FOREIGN PATENT DOCUMENTS

| | | |
|---|---|---|
| DE | 10 2010 029 725 A1 | 12/2011 |
| JP | H08-185746 A | 7/1996 |
| JP | 2006-311699 A | 11/2006 |

\* cited by examiner

GROMMET

This is a Division of application Ser. No. 15/338,713 filed on Oct. 31, 2016, which in turn is a Division of application Ser. No. 14/324,661 filed Jul. 7, 2014, which claims the benefit of Japanese Patent Application No. 2013-140911 filed Jul. 4, 2013. The disclosure of the prior applications is hereby incorporated by reference herein in its entirety.

TECHNICAL FIELD

The present disclosure relates to a grommet.

BACKGROUND

Conventionally, for hybrid cars and electric cars, wiring is often arranged by inserting a wire harness routed, for example, between the battery and the inverter, or between the inverter and the motor, into a metal pipe. The metal pipe is disposed under the floor of the automobile body along the front-back direction. This metal pipe has the function to shield the wire and the function to protect it from air-borne stones and the like. After being guided into the engine compartment, the metal pipe may be connected to the inverter side via a metal braid portion. The metal braid portion, which is formed by braiding metal strands into a mesh form, is attached to cover an end portion of the metal pipe, and is connected to the end portion by being crimped with a crimp ring. Additionally, a waterproof grommet made of a rubber material may be fitted to the connection portion between the metal pipe and the metal braid portion, as depicted, for example, in FIG. 1 of JP 2006-311699A.

SUMMARY

Meanwhile, it is conceivable that high pressure wash water is also splashed to a place where a grommet may be attached. However, the above-described conventional structure cannot sufficiently cope with such a situation, and there is the concern that the sealing between the corrugated tube and the grommet, and between the pipe and the grommet may be reduced over time.

The embodiments described herein have been completed in view of the above-described situation, and it is an object of the embodiments to provide a grommet that can achieve enhanced waterproofness.

A grommet according to one embodiment is a grommet that is attached to cover, for example, a pipe, inside which a wire is inserted, and, for example, a corrugated tube, so as to form a bridge therebetween, the corrugated tube being formed in a flexible bellows by alternately repeating ridges and troughs, and in which the wire drawn from an end portion of the pipe may be accommodated, including: a pipe-side end portion that may be formed in a tubular shape capable of being sealingly connected to an outer circumferential side of the pipe; a corrugated-side end portion that may be formed in a tubular shape capable of being sealingly connected to an outer circumferential side of the corrugated tube; and a plurality of sealing lips that may be provided on inner surfaces of the corrugated-side end portion and the pipe-side end portion so as to contact, for example, closely contact, to an outer surface of the pipe or the troughs of the corrugated tube, at least those of the sealing lips that are disposed at the pipe-side end portion being disposed inside and outside a width region that is fastened by a fastening band disposed on an outer surface of the pipe-side end portion.

The sealing lips located inside the width region of the fastening band are susceptible to degradation due to the influence of the fastening force of the fastening band, and tend to undergo a reduction in the sealing function over time. Nevertheless, the embodiments described herein are also effective in maintaining the sealing function over time because sealing lips are also disposed outside the width region of the fastening band, and thereby, these lips can function as auxiliary lips.

EMBODIMENTS

A preferred embodiment will now be described.

In the grommet according to the preferred embodiment, a tapered surface may be formed at a leading end portion of the outer surface of at least the pipe-side end portion of the pipe-side end portion and the corrugated-side end portion.

The grommet may be attached in a state in which it spans opposite ends on the pipe side and the corrugated tube side. In this case, assuming, for example, that high pressure wash water is dashed to the end face of at least the pipe-side end portion of the pipe-side end portion and the corrugated-side end portion, the end face is likely to receive the pressure of the high pressure wash water if it is formed so as to rise steeply. Accordingly, there is the possibility that the end face portion may be lifted, causing the wash water to enter inside the grommet. In this respect, with the above-described configuration, the high pressure wash water can be released along the taper of the tapered surface. Therefore, the lifting of the end face portion can be effectively reduced, thus maintaining the sealing function of the grommet.

Preferably, a portion that is located on the inner surface of the corrugated-side end portion and that is included within the width region fastened by the fastening band may be provided with: the sealing lips; and a restraining receiving portion against which a protruding end face of the ridges of the corrugated tube abuts so as to restrain collapsing of the sealing lips.

With this configuration, even if the fastening band excessively fastens the corrugated-side end portion of the grommet, the fastening force is received by the protruding end face of the ridge of the corrugated tube, and therefore, the sealing lips will not be excessively collapsed. Accordingly, it is possible to maintain the sealing function of the sealing lips.

Embodiment 1

Next, Embodiment 1 of the grommet will be described with reference to the drawings. In the present embodiment, a description will be given of a grommet G1 that is provided in the routing path of a wire harness WH that connects a battery mounted in, for example, a vehicle compartment on, for example, the rear side to an inverter mounted in an engine compartment in, for example, a hybrid car.

Figure 1:
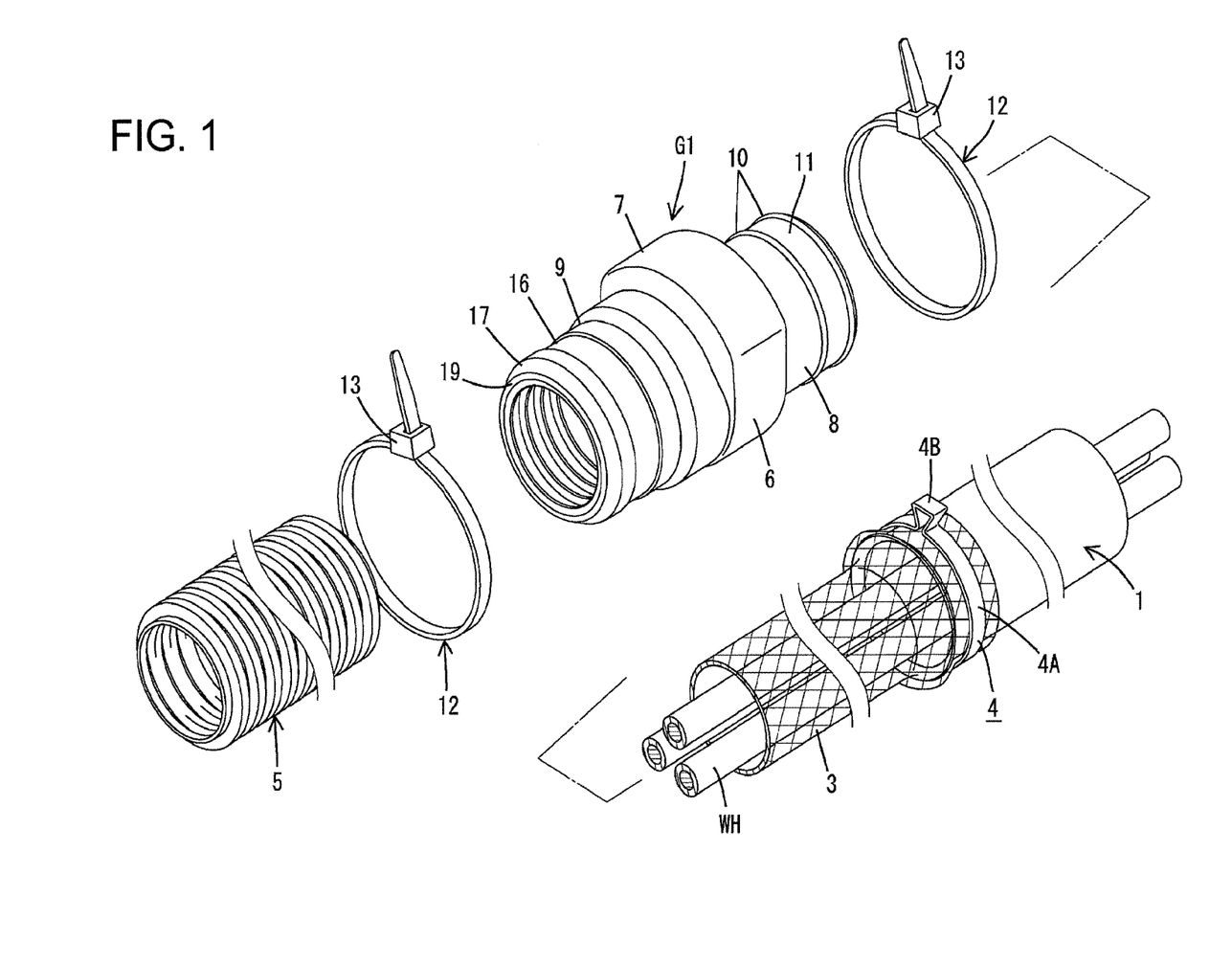
FIG. 1 is an exploded perspective view showing an area around a portion where a grommet is attached.
Figure 3:
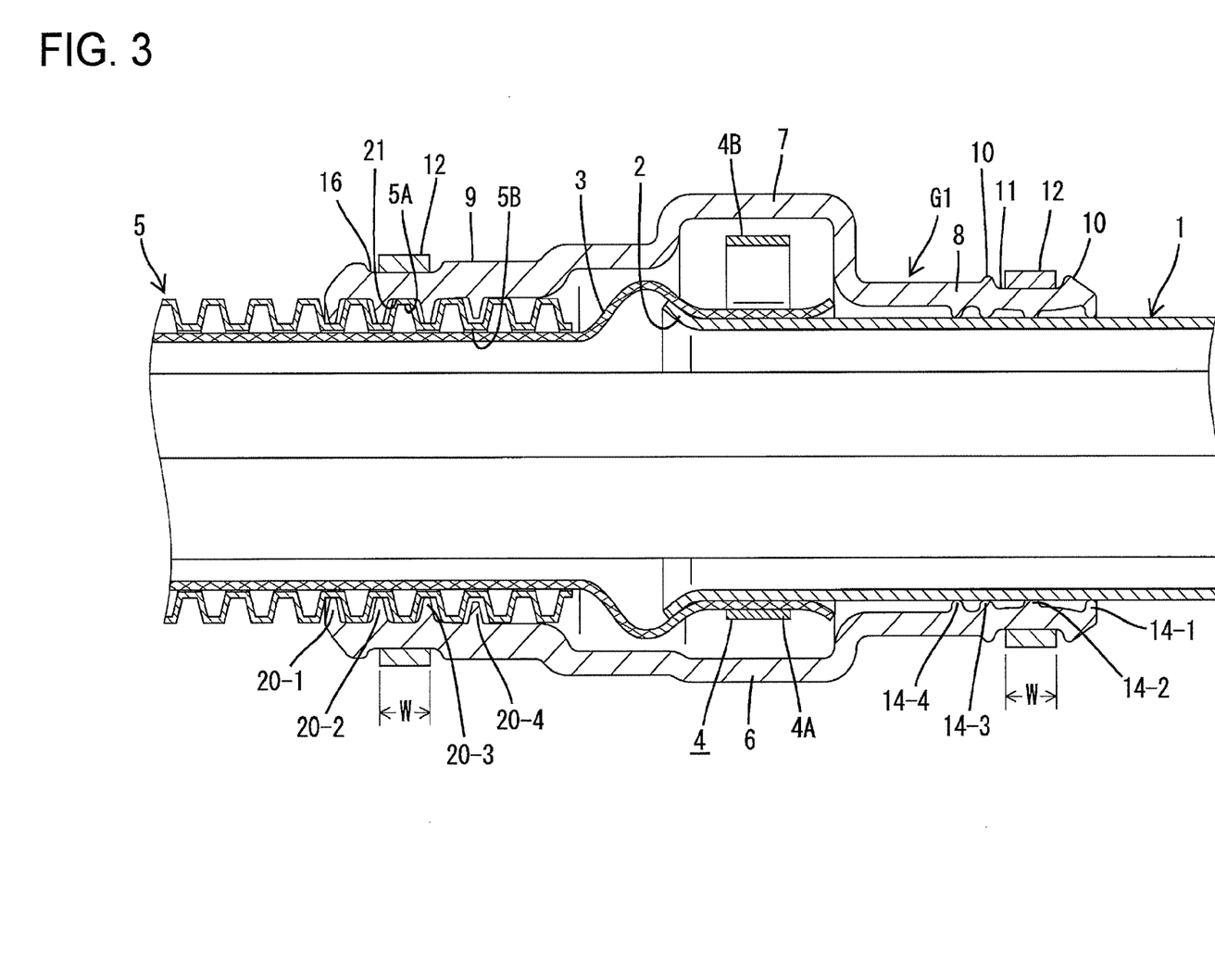
FIG. 3 is a cross-sectional view at the portion where the grommet is attached.

As shown in FIG. 1, the wire harness WH may be made up of a plurality of wires. A part of the wire harness WH is inserted into a shield pipe 1 that may be made of a conductive metal. For example, the shield pipe 1 may be made of aluminum or an aluminum alloy, and may be disposed under the floor of the vehicle body. Additionally, as shown in FIG. 3, the leading end of the shield pipe 1 may be flared in, for example, a trumpet shape to form a flared portion 2.

One end of a metal braid portion 3 may be connected to one end portion of the shield pipe 1. The metal braid portion 3 may be formed by braiding, for example, copper-based metal strands having, for example, tin-plated surfaces into, for example, a mesh-like, long tubular shape. The wires that have been drawn from the shield pipe 1 may be inserted in the metal braid portion 3. The metal braid portion 3 may be attached to cover the outer surface of the shield pipe 1, and may be crimped, for example, fixedly crimped, using, for example, crimp ring 4.

The crimp ring 4 may be a known crimp ring. In its natural state, a part of a ring-shaped main portion 4A of the crimp ring 4 is widened radially outward and protrudes as a crimp portion 4B. At the time of fastening the crimp ring 4, the main portion 4A can be shifted to a reduced diameter state by, for example, pinching the basal portions of the crimp portion 4B to move close to each other, and thereby, the metal braid portion 3 may be, for example, fixedly crimped to the shield pipe 1.

The metal braid portion 3 may be inserted in the corrugated tube 5 except for a part of its area on the side connected to the shield pipe 1, and an end portion of the metal braid portion 3 that may extend all the way to the connection to an inverter (not shown). Thus, the shielding properties of the wire harness WH are ensured over the length for which the shield pipe 1 and the metal braid portion 3 are provided.

The corrugated tube 5 may be formed of, for example, a synthetic resin material and may be in a unitary and elongated tube shape. The circumferential surface of the corrugated tube 5 may be formed in a bellows shape in which ridges 5A and troughs 5B may be repeated, and has good flexibility. The grommet G1 that accommodates the metal braid portion 3 exposed from the corrugated tube 5 is attached between the corrugated tube 5 and the shield pipe 1, bridging the corrugated tube 5 and the shield pipe 1.

The grommet G1 may be formed of, for example, a rubber material, for example, a ethylene propylene diene monomer rubber (EPDM) as, for example, a unitary body. The axial central portion of the grommet G1 may serve as a base portion 6, and an accommodating portion 7 that bulges radially outward and over a predetermined length range in the circumferential direction may be formed on a part of the base portion 6. The crimp portion 4B of the crimp ring 4 may be accommodated in the interior space of the accommodating portion 7.

A pipe-side end portion 8 may be formed on one end side of the grommet G1, and a corrugated-side end portion 9 may be formed on the other end side thereof. Both the pipe-side end portion 8 and the corrugated-side end portion 9 may be formed, for example, in a cylindrical shape. The pipe-side end portion 8 allows an end portion of the shield pipe 1 to be inserted inside and the corrugated-side end portion 9 can be fitted on the outer circumferential side of the corrugated tube 5.

Two ring-shaped protrusions 10 may be formed at an interval around the entire circumference of the outer surface of the pipe-side end portion 8 at positions that may be near the end portion. The portion between the two protrusions 10 may serve as an attachment groove 11 for positioning a fastening band 12. The the width of the attachment groove 11 may be set to be slightly wider than the width of the fastening band 12.

Since the fastening band 12 may be a known fastening band, a general description of a fastening band is provided. The fastening band 12 may be formed of a synthetic resin material, and may preferably in a unitary and band-shaped body. At one end portion of the fastening band 12, a lock portion 13 may be formed that allows the other end side of the fastening band 12 to be inserted therethrough. On the other end side, a number of locking edges that may be serrated (not shown) may be formed along the length direction. Additionally, flexible locking pawls (not shown) may be formed inside the lock portion 13. Pulling the other end side that is passed through the lock portion 13 causes the locking pawls to be selectively locked to the locking edges. This allows for the pipe-side end portion 8 to be tied and, for example, fixedly fastened to the shield pipe 1.

Figures 2A, 2B, 2C:
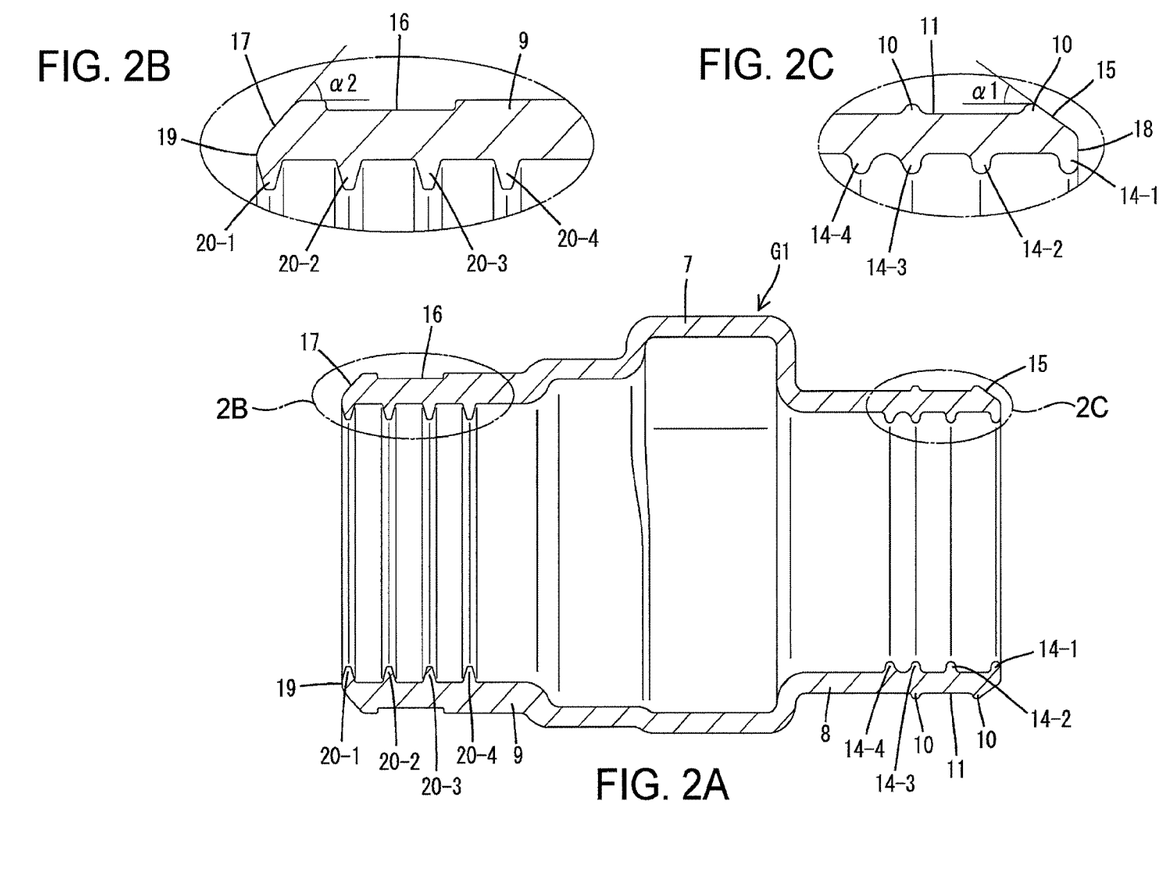
FIG. 2A is a cross-sectional view of the grommet.
FIG. 2B is a zoomed-in view of a portion of the grommet in FIG. 2A.
FIG. 2C is a zoomed-in view of a portion of the grommet in FIG. 2A.

On the other hand, as shown in FIGS. 2A-2C, a plurality of pipe-side sealing lips 14-1 to 14-4 may be provided on the inner surface of the pipe-side end portion 8. The pipe-side sealing lips 14-1 to 14-4 may be formed integrally and protrudingly around the entire circumference, and each of them may contact, for example, closely contact, the outer surface of the shield pipe 1 to provide sealing. In the present embodiment, the pipe-side sealing lips 14-1 to 14-4 may comprise one (first lip 14-1) provided at the opening edge of the pipe-side end portion 8, one (second lip 14-2) provided at a portion below, for example, directly below, the axial central portion of the attachment groove 11, one (third lip 14-3) provided at a portion displaced, for example, slightly inward from a portion below, for example, directly below the protrusion 10 located away from the opening edge, and one (fourth lip 14-4) provided at a portion displaced further inward from the third lip 14-3. Thus, for example, in the present embodiment, only the second lip 14-2 may be located in a width region (the region within the range indicated by W in FIG. 3) that is fastened with the fastening band 12, and the other lips may be disposed so as to be displaced from that width region and may function as auxiliary lips. Furthermore, the protruding heights of the pipe-side sealing lips 14-1 to 14-4 may be made uniform.

Additionally, a pipe-side tapered surface 15 may be formed at the leading end of the outer surface of the pipe-side end portion 8. That is, an annular rising surface 18 that rises at a substantially right angle to the axis may be formed on the end face of the pipe-side end portion 8. Also, the above-described pipe-side tapered surface 15 may be formed around the entire circumference, from the outer circumferential edge of the rising surface 18 to the top portion of the protrusion 10 located on the leading end side.

On the other hand, a mount groove 16 for positioning the fastening band 12 may be recessed around the circumference, for example, the entire circumference of the axial central portion on the outer surface of the corrugated-side end portion 9. A corrugated-side tapered surface 17 may also be formed at the leading end of the outer surface of the corrugated-side end portion 9. That is, an annular rising surface 19 that rises at a substantially right angle to the axis may be formed on the end face of the corrugated-side end portion 9. Also, the above-described corrugated-side tapered surface 17 may be formed around the circumference, for example, the entire circumference at a predetermined locking angle from the outer circumferential edge of the rising surface 19. In the present embodiment, the inclination angle $\alpha 1$ of the pipe-side tapered surface 15 may be set to be smaller than the inclination angle $\alpha 2$ of the corrugated-side tapered surface 17 ($\alpha 1 < \alpha 2$).

As shown in FIGS. 2A-2C, a plurality of corrugated-side sealing lips 20-1 to 20-4 may be provided on the inner surface of the corrugated-side end portion 9. The corrugated-side sealing lips 20-1 to 20-4 may be provided at a uniform pitch in order from the one provided at the opening edge of the corrugated-side end portion 9 to the inner side. This pitch may be the same as the pitch of the ridges 5A and the troughs 5B of the corrugated tube 5. The protruding height of the corrugated-side sealing lips 20-1 to 20-4 may be set to be higher than that of the pipe-side sealing lips 14-1 to 14-4. In a state in which the end portion of the corrugated tube 5 may be inserted in the corrugated-side end portion 9, the protruding end portions of the corrugated-side sealing lips contact, for example, closely contact to the bottom faces of the troughs 5B of the corrugated tube 5 to provide sealing.

Of the corrugated-side sealing lips 20-1 to 20-4, the two sealing lips (20-2, 20-3) located at the center may be positioned such that they may be at least partly included within the width region of the fastening band 12 that securely fastens the corrugated-side end portion 9 within the mount groove 16, whereas the corrugated-side sealing lip 20-1 provided at the opening edge and the corrugated-side sealing lip 20-4 provided at the innermost portion may be both positioned outside the width region W, and may function as auxiliary lips.

Furthermore, one of the ridges 5A of the corrugated tube 5 may be positioned within the width region W of the fastening band 12 at the corrugated-side end portion 9. In FIG. 3, the ridge 5A may be positioned substantially directly below the fastening band 12, and the ridge 5A may abut against the portion of the inner surface of the corrugated-side end portion 9 that may be located between the two corrugated-side sealing lips 20-2 and 20-3 positioned within the width region W. Thus, this portion can function as a restraining receiving portion 21 that avoids an excessive collapsing of the corrugated-side sealing lips 20-1 to 20-4 included within the width region W in the case where the fastening band 12 may be excessively fastened.

In the present embodiment 1, the grommet G1 may be mounted, for example, in the following manner. First, a part of the metal braid portion 3 inserted in the corrugated tube 5 may be pulled outside, and may be attached to cover the outer surface of an end portion of the shield pipe 1. Then, the crimp ring 4 that has been previously fitted to the shield pipe 1 side may be moved to the covered portion. By crimping the crimp portion 4B of the crimp ring 4 in this state, the metal braid portion 3 may be crimped, for example, fixedly crimped to the shield pipe 1.

Thereafter, the grommet G1 that has been previously fitted to the shield pipe 1 side or the corrugated tube 5 side may be moved toward the crimped area of the metal braid portion 3. Then, while the crimp portion 4B of the crimp ring 4 is being accommodated in the accommodating portion 7 of the grommet G1, the corrugated-side end portion 9 may be attached to cover the outer circumferential side of the end portion of the corrugated tube 5 and the pipe-side end portion 8 may be attached to cover the outer circumferential side of the shield pipe 1. Thereby, the grommet G1 may be attached so as to span the shield pipe 1 and the corrugated tube 5.

At this time, the pipe-side sealing lips 14-1 to 14-4 may contact, for example, closely contact, the outer surface of the shield pipe 1 at the pipe-side end portion 8, and the corrugated-side sealing lips 20-1 to 20-4 may enter the corresponding troughs 5B of the corrugated tube 5 and contact, for example, closely contact, the respective bottom faces at the corrugated-side end portion 9.

Finally, the fastening band 12 may be fastened within the attachment groove 11 of the pipe-side end portion 8, and the fastening band 12 may be fastened in the mount groove 16 at the corrugated-side end portion 9. Thereby, the mounting of the grommet G1 may be completed.

With the grommet G1 mounted in the above-described manner, it is possible to prevent water from entering between the grommet G1 and the shield pipe 1 or between the grommet G1 and the corrugated tube 5 by using, for example, the pipe-side sealing lips 14-1 to 14-4 and, for example, the corrugated-side sealing lips 20-1 to 20-4.

At the pipe-side end portion 8 and the corrugated-side end portion 9, the pipe-side sealing lip 14-2 and the corrugated-side sealing lips 20-2 and 20-3 may be included within the width regions W of the fastening bands 12 or may be positioned below, for example, directly below. Accordingly, an appropriate sealing pressure can be applied to the pipe-side sealing lip 14-2 and the corrugated-side sealing lips 20-2 and 20-3 as long as the fastening bands 12 are appropriately fastened. Even if the fastening band 12 is excessively fastened on the corrugated tube 5 side, the ridge 5A of the corrugated tube 5 may be positioned below, for example, directly below, the fastening band 12 so as to abut against the restraining receiving portion 21. Thus, the corrugated-side sealing lips 20-2 and 20-3 will not be collapsed excessively, and the sealing properties are achieved.

Since compressive pressure constantly acts from the fastening bands 12 on the pipe-side sealing lip 14-2 and the corrugated-side sealing lips 20-2 and 20-3 that may be included within the width regions of the fastening bands 12, it is conceivable that these sealing lips may deteriorate over time, resulting in a reduction in the sealing function. However, in the present embodiment, the pipe-side sealing lips 14-1, 14-3, and 14-4 and the corrugated-side sealing lips 20-1 and 20-4 may be also positioned outside the width regions W of the corresponding fastening bands 12 so as to sandwich the width regions W. The lips that may be located outside the width regions W slowly undergo deterioration over time, and may be effective in maintaining the sealing properties for a long time. It is preferable that this structure is provided at the pipe-side end portion 8 to which high pressure wash water may be splashed.

Furthermore, when considering sealing properties, it is possible that high pressure wash water may be splashed to the end face of the pipe-side end portion 8. It is also possible that the wash water is splashed to the end face of the corrugated-side end portion 9. Conventionally, this end face may have a large area of the rising surface that rises at a right angle to the axis, and therefore, there is the possibility that the end face may be lifted, allowing entry of water. However, in the present embodiment, the provision of the corrugated-side tapered surface 17 in addition to the pipe-side tapered surface 15 makes the areas of the rising surfaces 18 and 19 sufficiently smaller than those of the conventional configuration. In addition, the pressure of high pressure wash water may be released along the two tapered surfaces 15 and 17, and it is therefore possible to reliably reduce situations where the end faces of the two end portions 8 and 9 of the grommet G1 may be lifted, and maintain the sealing properties.

Furthermore, since the corrugated-side sealing lips 20-1 to 20-4 that may be formed at the opening edge enter the troughs 5B of the corrugated tube 5 at the corrugated-side end portion 9, this also suppresses the occurrence of the lifting. In view of this, in the present embodiment, the lifting does not easily occur even if the inclination angle $\alpha 2$ of the corrugated-side tapered surface 17 is set to be larger than the inclination angle $\alpha 1$ of the pipe-side tapered surface 15. Accordingly, the thickness of the corrugated-side end portion 9 can be increased more than that of the pipe-side end portion 8. The corrugated tube 5 side may be the side on which the wire routing direction can be appropriately changed. Accordingly, it may be useful for the purpose of ensuring the followability to the corrugated tube 5 that a certain amount of thickness is ensured for the corrugated-side end portion 9 at the time of changing the routing direction so as to be able to increase rigidity.

Conventionally, the corrugated-side end portion 9 may be connected to the corrugated tube 5 by tape winding without using the fastening band 12. However, it has been pointed out that such tape winding has lower connection reliability due to operational variations. Fastening using the fastening band 12 as in the present embodiment can relatively easily provide a constant fastening force by using, for example, a jig or the like. Thus, a higher connection reliability may be achieved. Furthermore, although tape winding may cause the problem of tape deterioration over time, the present embodiment may not have such a problem.

Figure 4A:
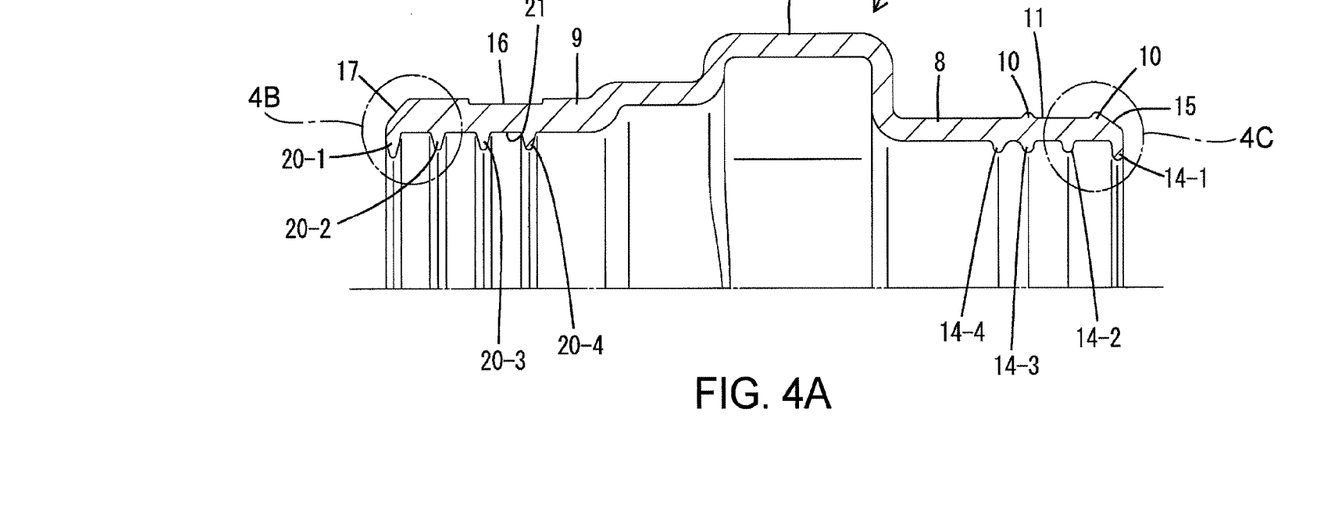
FIG. 4A is a cross-sectional view showing a modification of the grommet.
Figure 4B:
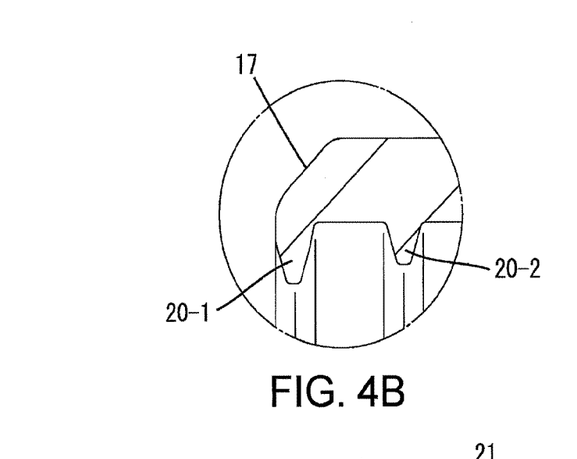
FIG. 4B is a zoomed-in view of a portion of the grommet in FIG. 4A.
Figure 4C:
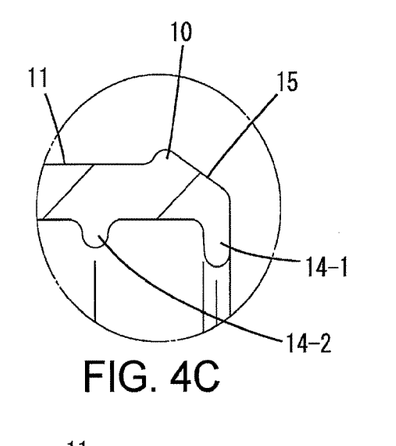
FIG. 4C is a zoomed-in view of a portion of the grommet in FIG. 4A.

FIGS. 4A-4C shows a modification of the corrugated-side sealing lips 20-1 to 20-4 and the pipe-side sealing lips 14-1 to 14-4. In a grommet G2 as shown in FIGS. 4A-4C, of the corrugated-side sealing lips 20-1 to 20-4 and the pipe-side sealing lips 14-1 to 14-4, the pipe-side sealing lip 14-1 and the corrugated-side sealing lip 20-1 that may be located at the opening edges may be set to have a higher protruding height than others. The reason for this is to cope with the possibility that the entire opening edges of the pipe-side end portion 8 and the corrugated-side end portion 9 may be flared when the fastening bands 12 are fastened, and the sealing functions of the corrugated-side sealing lip 20-1 and the pipe-side sealing lip 14-1 located at the opening edges may be reduced.

This can also contribute to an improvement in the sealing properties of the grommet G2.

The present disclosure is not limited to the embodiments described above, and shown in the drawings. For example, the following embodiments also fall within the technical scope of the present disclosure.

Although the metal braid portion 3 and the corrugated tube 5 may be formed separately in the above-described embodiment, the metal braid portion 3 may be, for example, inserted in the corrugated tube 5 and formed integrally therewith.

Although the shield pipe 1 may be formed only of a metal material in the above-described embodiment, the shield pipe 1 may be formed, for example, by inserting a metal tubular body in a resin pipe.

The shield pipe 1 and the metal braid portion 3 may be provided along the routing region of the wire harness WH to ensure the shielding function in the above-described embodiment. However, in the case of using the present embodiment under conditions that do not require shielding, the pipe may not be a conductive metal and the metal braid portion 3 may be omitted.

What is claimed is:

1. An apparatus comprising:
a grommet, wherein
the grommet is capable of being attached to cover at least a portion of a corrugated tube having a flexible bellows shape comprising repeating ridges and troughs;
the grommet comprising:
a corrugated-side end portion that is formed in a tubular shape capable of being sealingly connected to an outer circumferential side of the corrugated tube;
a plurality of sealing lips that are provided on inner surfaces of the corrugated-side end portion so as to contact the troughs of the corrugated tube, wherein at least one of the plurality of sealing lips is formed at a leading end of the grommet;
a tapered surface formed at the leading end portion of the of the grommet;
a width region fastened by a fastening band is located on the corrugated-side end portion of the grommet; and
the sealing lips are formed around the entire circumference of the inner circumferential surface of the grommet;
at least one wire,
wherein at least a portion of the wire is inside the grommet; and
a braided member covering at least a portion of the wire inside the grommet,
wherein an annular rising surface that rises at a substantially right angle to a length-wise axis of the grommet is formed on an end face of the leading end of the grommet, and the tapered surface connects to the annular rising surface.

2. The apparatus according to claim 1, wherein
a portion of the grommet that is located on the inner surface of the corrugated-side end portion and that is included within the width region fastened by a fastening band comprises:
at least one of the plurality of sealing lips; and
a restraining receiving portion against which a protruding end face of the ridges of the corrugated tube can abut so as to prevent the sealing lips from collapsing.

3. The apparatus according to claim 1, wherein the width region fastened by the fastening band is adjacent to the tapered surface.

4. The apparatus according to claim 1, wherein the width region fastened by the fastening band is spaced away from the tapered surface.

5. The apparatus according to claim 1, wherein the width region fastened by a fastening band is a groove.

6. The apparatus according to claim 3, wherein the width region fastened by a fastening band is a groove.

7. The apparatus according to claim 4, wherein the width region fastened by a fastening band is a groove.

8. The apparatus according to claim 1, wherein at least one sealing lip, among the plurality of sealing lips formed at a leading edge of the grommet, is not fastened by a fastening band.

9. The apparatus according to claim 1, wherein the grommet forms a bridge between a pipe and the corrugated tube.

10. The apparatus according to claim 1, wherein at least two sealing lips of the plurality of sealing lips protrude at a same height.

11. An apparatus comprising:
a grommet, wherein the grommet is capable of being attached to cover at least a portion of a corrugated tube having a flexible bellows shape comprising repeating ridges and troughs;

the grommet comprising:
- a corrugated-side end portion that is formed in a tubular shape capable of being sealingly connected to an outer circumferential side of the corrugated tube;
- a plurality of sealing lips that are provided on inner surfaces of the corrugated-side end portion so as to contact the troughs of the corrugated tube, wherein at least one of the plurality of sealing lips is formed at a leading end of the grommet;
- a tapered surface formed at the leading end portion of the of the grommet;
- a width region fastened by a fastening band is located on the corrugated-side end portion of the grommet; and
- the sealing lips are formed around the entire circumference of the inner circumferential surface of the grommet;

at least one wire,
wherein at least a portion of the wire is inside the grommet; and a braided member covering at least a portion of the wire inside the grommet,
wherein the at least one of the plurality of sealing lips that is formed at the leading end of the grommet protrudes at a height higher than other sealing lips of the plurality of sealing lips that are not formed at the leading end of the grommet.

* * * * *